(12) United States Patent
Tang et al.

(10) Patent No.: US 11,137,346 B2
(45) Date of Patent: Oct. 5, 2021

(54) WAVELENGTH-MODULABLE SPECTRUM GENERATOR, AND SYSTEM AND METHOD FOR MEASURING CONCENTRATION OF GAS COMPONENT BASED THEREON

(71) Applicant: Chongqing University of Science and Technology, Chongqing (CN)

(72) Inventors: Dedong Tang, Chongqing (CN); Zhiqi Wang, Chongqing (CN); Xiaoyuan Sun, Chongqing (CN); Xubin Dong, Chongqing (CN); Hongjie Yang, Chongqing (CN)

(73) Assignee: CHONGQING UNIVERSITY OF SCIENCE AND TECHNOLOGY

( * ) Notice: Subject to any disclaimer, the term of this patent is extended or adjusted under 35 U.S.C. 154(b) by 0 days.

(21) Appl. No.: 16/856,212

(22) Filed: Apr. 23, 2020

(65) Prior Publication Data
US 2020/0363324 A1 Nov. 19, 2020

(30) Foreign Application Priority Data
May 17, 2019 (CN) .......................... 201910411925.8

(51) Int. Cl.
*G01J 3/02* (2006.01)
*G01N 21/31* (2006.01)

(52) U.S. Cl.
CPC .......... *G01N 21/314* (2013.01); *G01J 3/0208* (2013.01); *G01J 3/0227* (2013.01); *G01J 3/0237* (2013.01); *G01N 2021/3174* (2013.01)

(58) Field of Classification Search
CPC ......... G01N 21/314; G01N 2021/3174; G01N 21/255; G01N 21/31; G01J 3/0208; G01J 3/0227; G01J 3/0237; G01J 3/12
See application file for complete search history.

(56) References Cited

U.S. PATENT DOCUMENTS

| 2007/0154209 A1* | 7/2007 | Chang | .................... G03B 11/00 |
| | | | 396/544 |
| 2008/0044912 A1* | 2/2008 | Yamamoto | ......... G01N 33/4905 |
| | | | 436/69 |

* cited by examiner

*Primary Examiner* — Abdullahi Nur
(74) *Attorney, Agent, or Firm* — Michael A. Mann; Nexsen Pruet, LLC

(57) ABSTRACT

The present invention discloses a wavelength-modulable spectrum generator as well as a system and method for measuring concentration of a gas component based thereon. The wavelength-modulable spectrum generator includes a filter plate, a to-be-measured gas box and a light intensity receiving plate. A plate surface of the filter plate is encircled with N filter holes, and a filter lens with a specific refractive index is correspondingly fixedly arranged in each filter hole. A light source mounting position is fixed to a side of an in-light surface of the filter plate. After any light source is mounted at the light source mounting position, lights of the light source irradiate the filter lens. A rotation and deflection driving mechanism is connected with an out-light surface of the filter plate and drives the filter plate to rotate or deflect along the axis according to a preset angle.

12 Claims, 12 Drawing Sheets

WAVELENGTH-MODULABLE SPECTRUM GENERATOR, AND SYSTEM AND METHOD FOR MEASURING CONCENTRATION OF GAS COMPONENT BASED THEREON

CROSS REFERENCE TO RELATED APPLICATIONS

This application claims priority under 35 U.S.C. § 119 to Chinese Patent Application No. 201910411925.8 filed May 17, 2019, the entirety of which is incorporated by reference herein.

TECHNICAL FIELD

The present invention relates to the field of spectrum measurement technologies, and in particular to a wavelength-modulable spectrum generator as well as a gas component measurement system and method.

BACKGROUND

With the increasing development of measurement technologies, the spectrum measurement technology has been widely applied to various industries, such as measurement of gas components, liquid concentration, metal content etc. However, different objects should be measured with spectrums of specific types and wavelengths. For example, when a Fourier infrared spectrum is utilized to measure components of natural gas, the wavelength of the infrared spectrum needs to be specifically set according to different types of the components of the natural gas. But some special wavelengths need to be modulated temporarily during measurement process. The light source or even configurations of a measurement platform need to be changed. Replacing the light source with a different wavelength is complex meanwhile changing the configurations of a measurement platform requires a lot of time and may lead to poor reliability.

SUMMARY

To resolve the above problem, the present invention provides a wavelength-modulable spectrum generator and a gas component measurement system and method. The present invention obtains a corresponding spectrum with a specific type and wavelength based on measurement requirements, achieving large-range wavelength modulation. In addition, the generator has a simple structure, high reliability and low costs.

In order to achieve the above objectives, the present invention provides the following technical solutions:

A wavelength-modulable spectrum generator includes a filter plate. A plate surface of the filter plate is encircled with N filter holes, and a filter lens with a specific refractive index is correspondingly fixedly arranged in each filter hole.

A light source mounting position is fixed to a side of an in-light surface of the filter plate. After any light source is mounted at the light source mounting position, the light emitted by the light source shines on the filter lens.

A rotation and deflection driving mechanism is connected to an out-light surface of the filter plate and drives the filter plate to rotate or deflect along the axis according to a preset angle.

The filter holes may be circular and square, and the filter plate is uniformly encircled with the N filter holes.

The filter holes may be sector-shaped, and the filter plate is uniformly encircled with the N filter holes.

According to the above design, based on a required wavelength and in combination with the refractive indexes and the thicknesses of the filter lenses, the filter plate is driven to rotate to ensure that the light source irradiates a corresponding filter lens. By changing the deflection angle of the filter lens, the angle of the light source incident to the filter lens is changed so that the wavelength of the light passing through the filter lens meets the preset requirement. The wavelength spectrum generator can achieve large-range modulation of the wavelength to meet the requirements.

Where N is a positive integer and can be freely set according to the requirements.

Further, the rotation and deflection driving mechanism includes a universal joint. The universal joint includes a sequentially connected first lever and second lever. The first lever of the universal joint is connected with the center of the out-light surface of the filter plate while the second lever thereof is connected with a rotation driving shaft of a rotation driving motor.

A deflection driving shaft sleeve movably sleeves the first lever of the universal joint. A hinge joint is arranged on the deflection driving shaft sleeve and is connected with a drive rod of a servomotor.

The rotation driving motor and the servomotor are arranged on a support frame.

Where the rotation driving motor is a stepper motor and can be correspondingly adjusted according to a preset angle to meet the preset requirement. The servomotor is configured to drive the deflection driving shaft sleeve movably sleeving the first lever, to move forwards and backwards in an axial direction of the filter plate so as to drive the first lever of the universal joint to bend corresponding to the second lever. A bending angle can be adjusted to help measurement and control by utilizing the servomotor.

A further technical solution is as follows: a horizontal deflection limit frame is also hinged between the deflection driving shaft sleeve and the support frame.

The horizontal deflection limit frame includes a first hinge block and a second hinge block.

The first hinge block is fixed to the deflection driving shaft sleeve.

The second hinge block is fixed to the support frame. The second hinge block extends in a horizontal direction of the rotation driving shaft and then is hinged with the first hinge block. The hinging axial line of the first hinge block and the second hinge block is in parallel with the deflection axial line of the deflection driving shaft sleeve, and passes through a connection point of the first lever and the second lever of the universal joint (4a).

By adopting the above technical solution, the first lever of the universal joint is limited by the horizontal deflection limit frame 4f and the deflection driving shaft sleeve 4b to ensure relative fixation of a position between the first lever of the universal joint and the deflection driving shaft sleeve 4b. Furthermore, the hinging axial line is in parallel with the deflection axial line of the deflection driving shaft sleeve, that is, a deflection direction of the universal joint is controlled to be only limited to an extension plane of the drive rod of the servomotor. Moreover, the concentricity is ensured when the first lever of the universal joint is driven by the deflection driving shaft sleeve to synchronously deflect. The first lever of the universal joint is driven by the deflection driving shaft sleeve to deflect in the shape of a sector. Therefore, only when the axial line of the first hinge block and the second hinge block is superimposed with the deflection axial line of the universal joint, the horizontal deflection limit frame does not limit rotation of the universal joint when limiting the deflection, that is, they synchronously deflect in the shape of the sector.

A further technical solution is as follows: the wavelength-modulable spectrum generator further includes a controller. A rotation driving end of the controller is connected with the rotation driving motor.

A deflection driving end of the controller is connected with the servomotor.

A deflection angle measuring end of the controller is connected with an angle sensor arranged in the servomotor.

By adopting the above technical solution, the controller is used to jointly control a rotation angle of the rotation driving motor. A deflection angle of the filter plate is measured by controlling the servomotor, where an extension angle of the servomotor can be obtained according to the correlation of an extension angle of the servomotor and the defection angle of the filter plate.

A system for measuring concentration of a gas component based on the wavelength-modulable spectrum generator has the following key features: the system further includes a to-be-measured gas box and a light intensity receiving plate, which are fixed to the first lever of the universal joint. The to-be-measured gas box and the light intensity receiving plate are sequentially arranged between the side of the out-light surface of the filter plate and the deflection driving shaft sleeve. The filter plate, the to-be-measured gas box and the light intensity receiving plate are coaxially arranged and are mutually parallel.

A box body of the to-be-measured gas box is fabricated by a transparent material and is filled with a to-be-measured gas.

A light intensity measurement film is arranged on the light intensity receiving plate and is connected with a gas measurement input end of the controller.

According to the above design, the to-be-measured gas box and the light intensity receiving plate are sequentially arranged on the side of the out-light side of the filter plate. The to-be-measured gas is directly measured with reference to a required spectrum wavelength obtained by the wavelength-modulable spectrum generator. The light intensity receiving plate is also used for measuring the light intensity of the spectrum of lights after the lights pass through the to-be-measured gas box. In combination with the obtained light intensity, concentration of a component of the to-be-measured gas is calculated.

A measurement method based on the system for measuring concentration of a gas component specifically includes the following steps:

S1: presetting a type of a to-be-measured gas, a required type of a spectrum and a corresponding wavelength λ of the spectrum, mounting a light source corresponding to the type of the spectrum, and acquiring a thickness L of a to-be-measured gas box;

S2: according to the type of the spectrum and the corresponding wavelength λ of the spectrum, comprehensively selecting a filter lens to obtain a refractive index n and a thickness d of the fiber lens, and also obtaining an incidence angle θ of the light source on an in-light surface of the filter lens and an initial light intensity $I_0$ after the light source passes through the corresponding filter lens;

S3: controlling the rotation driving motor to rotate by the controller such that the light source irradiates the filter lens with the corresponding refractive index n;

S4: controlling the servomotor to drive extension by the controller such that the deflection driving shaft sleeve pulls the first lever of the universal joint to deflect an angle θ along a lever joint;

S5: acquiring an out-put light intensity $I_v$ measured by the light intensity measurement film by the controller;

S6: according to the initial light intensity $I_0$ and the out-put light intensity $I_v$, calculating the concentration c of a component of the to-be-measured gas in the to-be-measured gas box in combination with the beer-lambert law.

Where in step S2, an incident angle of a light source is obtained by calculating according to the following formula:

$$\lambda = \frac{2nd \cos\left[\arcsin\left(\frac{\sin\theta}{n}\right)\right]}{m}; \quad (1)$$

where m is a constant; d is a thickness of the filter lens; and $$0 < \theta < \frac{\pi}{2}.$$

Where step S6 of calculating the concentration c of a component according to the initial light intensity $I_0$ and the out-put light intensity $I_v$ utilizes the following formula:

$$I_v = I_0 \exp[-a(v)cL] \quad (2);$$

where a(v) is an attenuation coefficient which can be obtained by querying a table. L is a thickness L of the to-be-measured gas box.

The present invention has the following beneficial effects: the corresponding spectrum with the specific type and the specific wavelength is obtained according to the measurement requirements. Rotation of the filter plate can be controlled by adjusting the universal joint; the incidence angle is changed through extension of the deflection driving shaft sleeve; the reliability of deflection is improved in combination with the deflection limiting mechanism. Large-range wavelength modulation is achieved. The generator has a simple structure, high reliability and low costs. Fast measurement is achieved. Measurement of various gases under different wavelength conditions can be achieved without changing the device structure.

Figure 1:
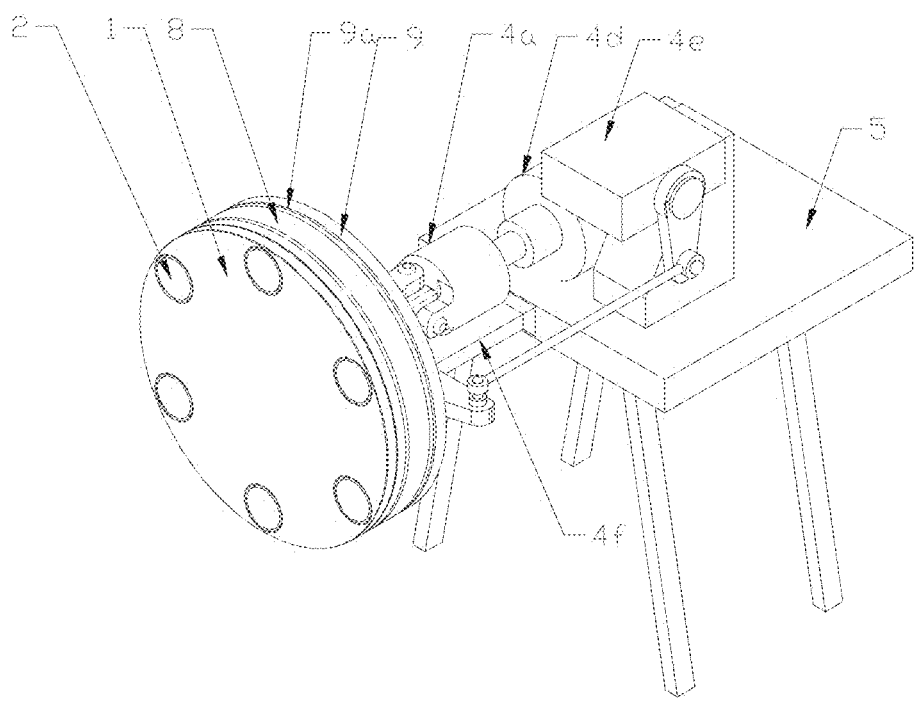
FIG. 1 is a first schematic structural diagram of a wavelength-modulable spectrum generator of the present invention.

In the figures, 1. filter plate 2. filter lens 3. light source mounting position 4. rotation and deflection driving mechanism 5. support frame 6. controller 7. angle sensor 8. to-be-measured gas box 9. light intensity receiving plate 4a. universal joint 4b. deflection driving shaft sleeve 4d. rotation driving motor 4e. servomotor 4f. horizontal deflection limit frame

DETAILED DESCRIPTION

Specific embodiments and working principle of the present invention will be further described in detail with reference to the accompanying drawings.

Figure 2:
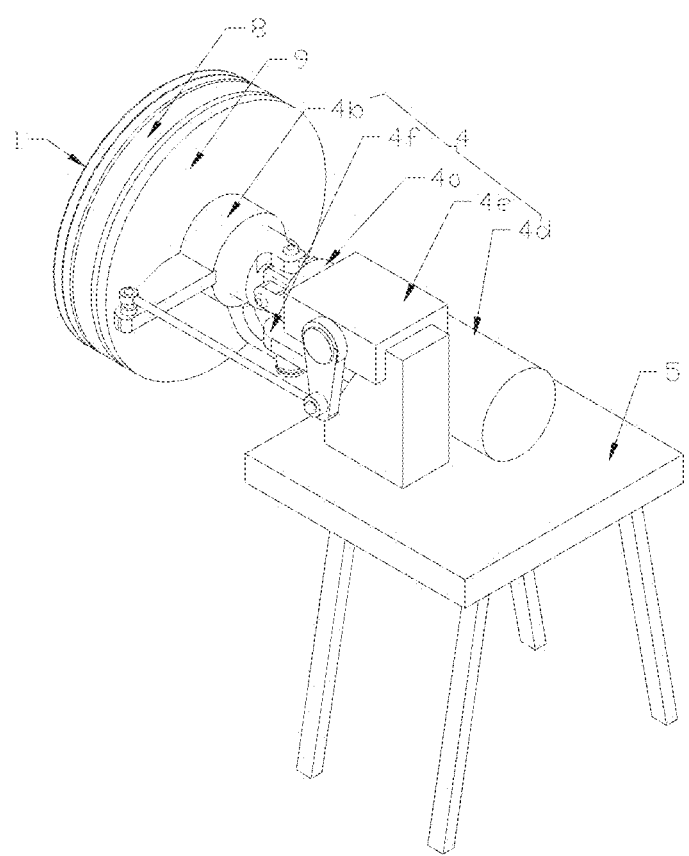
FIG. 2 is a second schematic structural diagram of a wavelength-modulable spectrum generator of the present invention.

As shown in FIG. 1 and FIG. 2, a wavelength-modulable spectrum generator includes a filter plate 1. A plate surface of the filter plate 1 is encircled with N filter holes, and a filter lens 2 with a specific refractive index is correspondingly fixedly arranged in each filter hole.

Figure 3:
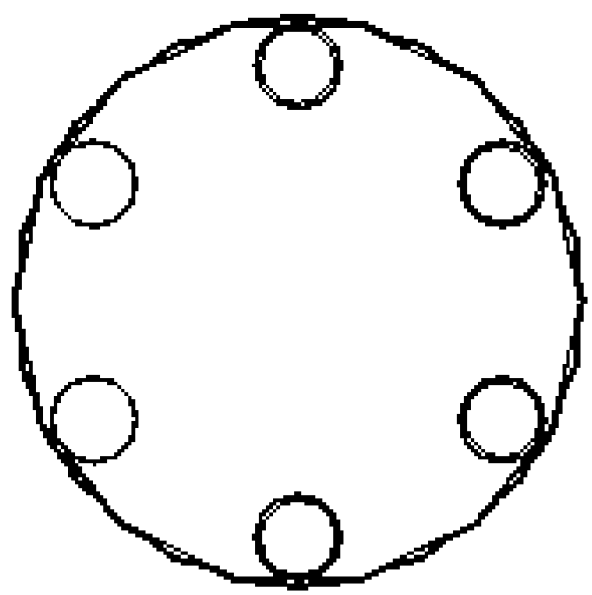
FIG. 3 is a schematic structural diagram of a first embodiment of a filter plate according to the present invention.

In an implementation, N=6. As shown in FIG. 1 to FIG. 3, the filter hole is circular.

Figure 4:
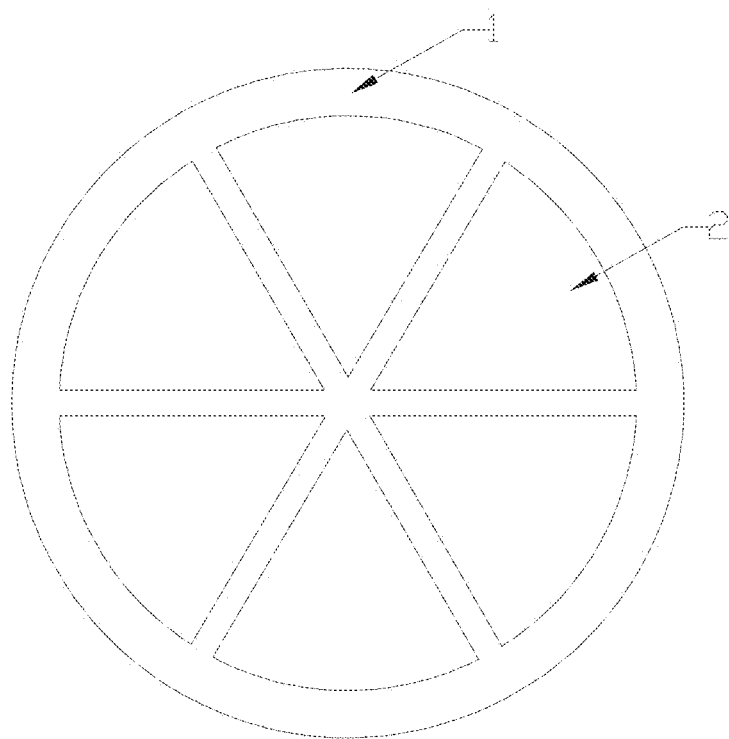
FIG. 4 is a schematic structural diagram of a second embodiment of a filter plate according to the present invention.

In another implementation, N=6. As shown in FIG. 4, the filter hole is sector-shaped.

Figure 6:
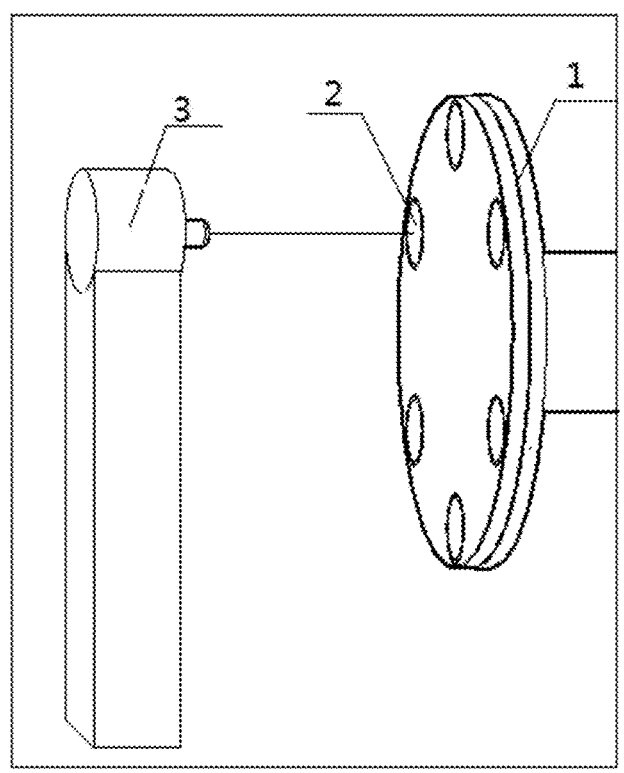
FIG. 6 is a schematic diagram showing mounting and irradiating of a light source according to the present invention.

As shown in FIG. 1 and FIG. 6, a light source mounting position 3 is fixed to a side of an in-light surface of the filter plate 1. After any light source is mounted at the light source mounting position 3, lights of the light source irradiate the filter lens 2.

A rotation and deflection driving mechanism 4 is connected with an out-light surface of the filter plate 1 and drives the filter plate 1 to rotate or deflect along the axis according to a preset angle.

Figure 5:
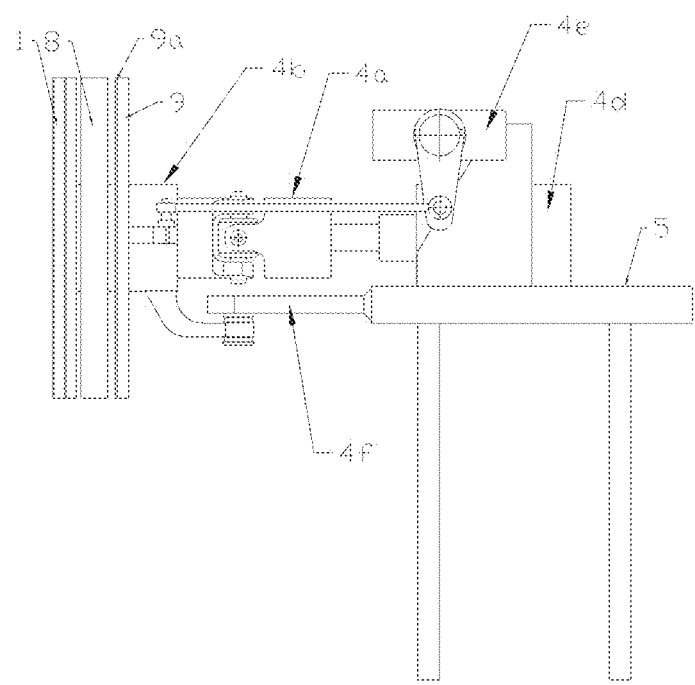
FIG. 5 is a schematic diagram showing a mounting structure of a to-be-measured gas box and a light intensity receiving plate according to the present invention.

In the embodiment, with reference to FIG. 1, FIG. 2 and FIG. 5, the rotation and deflection driving mechanism 4 includes a universal joint 4a. The universal joint 4a includes sequentially connected first lever and second lever. The first lever of the universal joint 4a is connected with the center of the out-light surface of the filter plate 1 while the second lever thereof is connected with a rotation driving shaft of a rotation driving motor 4d.

With reference to FIG. 4, a deflection driving shaft sleeve 4b movably sleeves the first lever of the universal joint 4a. A hinge joint is arranged on the deflection driving shaft sleeve 4b and is connected with a drive rod of a servomotor 4e. With reference to FIG. 1 and FIG. 2, the drive rod includes a deflection pull rod and a servomotor arm, one end of the defection pull rod is connected with a ball end of the hinge joint of the deflection driving shaft sleeve 4b while the other end thereof is connected with a ball end of one end of the servomotor arm. The other end of the servomotor arm is connected with a drive output end of the servomotor 4e. Through matching of the deflection pull rod and the servomotor arm, when the servomotor 4e rotationally drives one end of the servomotor arm to rotate by taking the other end of the servomotor arm as the center in the shape of an arc, the deflection pull rod is driven to move in a direction of the arc. Therefore, one end of the deflection pull rod pulls the hinge point such that the deflection drive shaft sleeve 4b sleeving the first lever of the universal joint 4a drives the first lever to deflect in a plane vertical to the arc. The arc rotation needs a certain flexibility, so a ball-end connection is utilized to prevent mutual blockage.

Where the principle of using the servomotor 4e to drive the deflection driving shaft sleeve 4b to deflect is widely applied in the prior art, such as to wheel steering of an automobile, a mechanical arm and the like, and the structure is simple and easy to understand, which are not described in the present invention.

In the embodiment, with reference to FIG. 1 and FIG. 2, the rotation driving motor 4d and the servomotor 4e are arranged on a support frame 5.

With reference to FIG. 1, FIG. 2 and FIG. 5, a horizontal deflection limit frame 4f is also hinged between the deflection driving shaft sleeve 4b and the support frame 5.

The horizontal deflection limit frame 4f includes a first hinge block and a second hinge block.

The first hinge block is fixed to the deflection driving shaft sleeve 4b.

The second hinge block is fixed to the support frame 5. The second hinge block extends in a horizontal direction of the rotation driving shaft and then is hinged with the first hinge block. The hinging axial line is in parallel with the deflection axial line of the deflection driving shaft sleeve 4b.

In the embodiment, with reference to FIG. 5, the hinging axial line of the first hinge block and the second hinge block passes through a connection point of the first lever and the second lever of the universal joint 4a.

Figure 7:
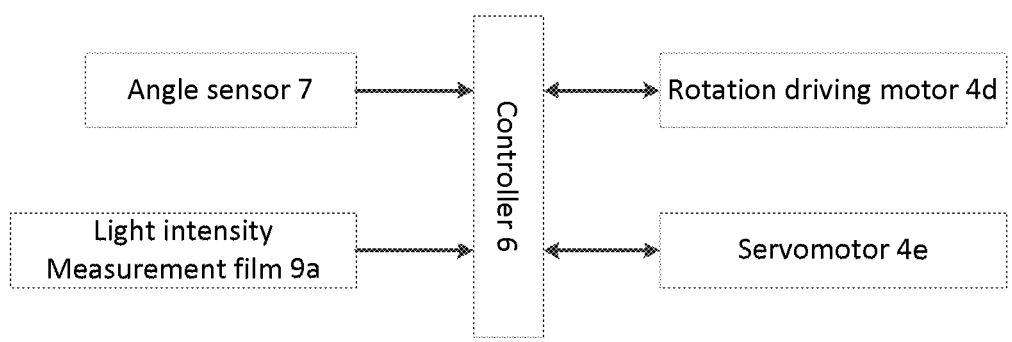
FIG. 7 is a control block diagram of a system for measuring concentration of a gas component of the present invention.

In the embodiment, with reference to FIG. 7, to achieve intelligent control, the wavelength-modulable spectrum generator further includes a controller 6. A rotation driving end of the controller 6 is connected with the rotation driving motor 4d. A deflection driving end of the controller 6 is connected with the servomotor 4e. A deflection angle measuring end of the controller 6 is connected with an angle sensor 7 arranged in the servomotor 4e.

With reference to FIG. 1 and FIG. 6, a system for measuring concentration of a gas component based on the wavelength-modulable spectrum generator further includes a to-be-measured gas box 8 and a light intensity receiving plate 9, which are fixed to the first lever of the universal joint 4a. The to-be-measured gas box 8 and the light intensity receiving plate 9 are sequentially arranged between the side of the out-light surface of the filter plate 1 and the deflection driving shaft sleeve 4b. The filter plate 1, the to-be-measured gas box 8 and the light intensity receiving plate 9 are coaxially arranged and are mutually parallel.

In the embodiment, a box body of the to-be-measured gas box 8 is fabricated by a transparent material and is filled with a to-be-measured gas. Furthermore, an air inlet and an air outlet are arranged on the to-be-measured gas box 8 and are used for feeding and discharging the gas. In the embodiment, a thickness of the box body of the to-be-measured gas box 8 is L.

To measure the light intensity of a spectrum after lights pass through the to-be-measured gas box 8, a light intensity measurement film 9a is arranged on the in-light surface of the light intensity receiving plate 9. With reference to FIG. 7, the light intensity measurement film 9a is connected with a gas measurement input end of the controller 6.

Figure 8:
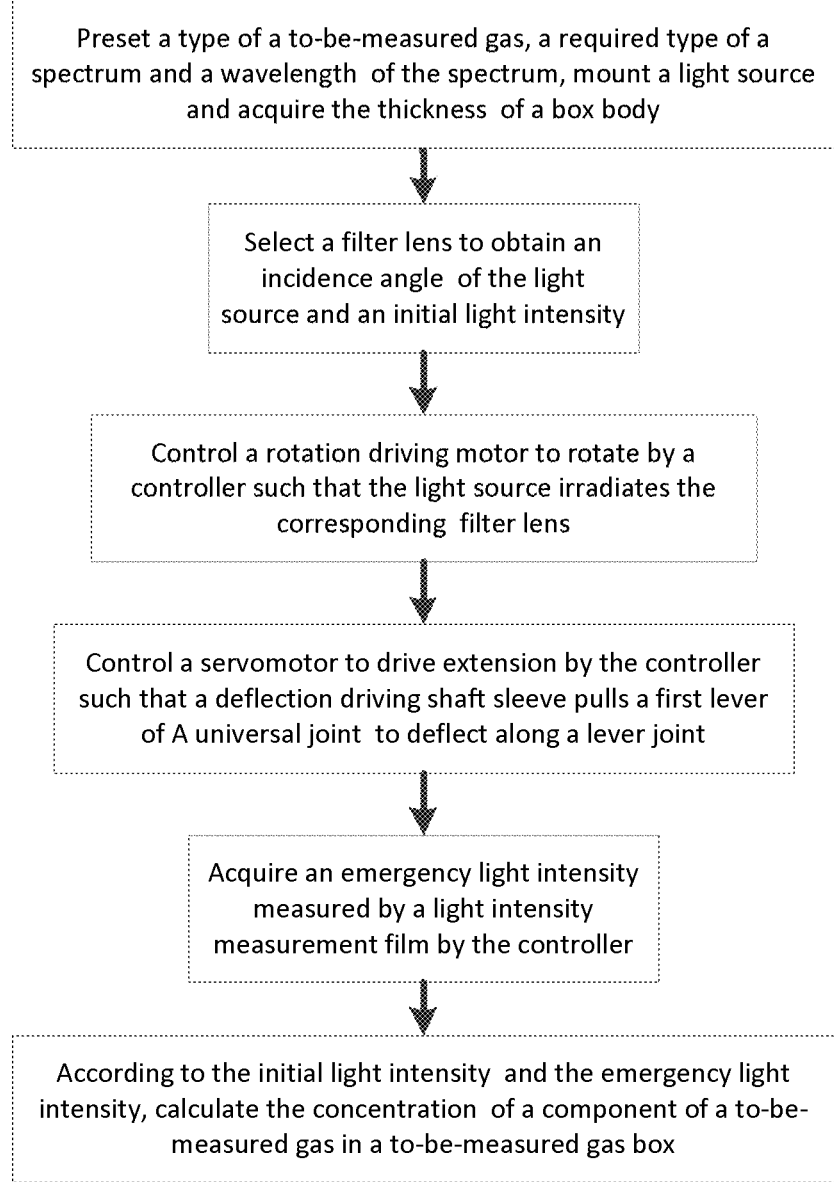
FIG. 8 is a flowchart of a method for measuring concentration of a gas component of the present invention.
Figure 9:
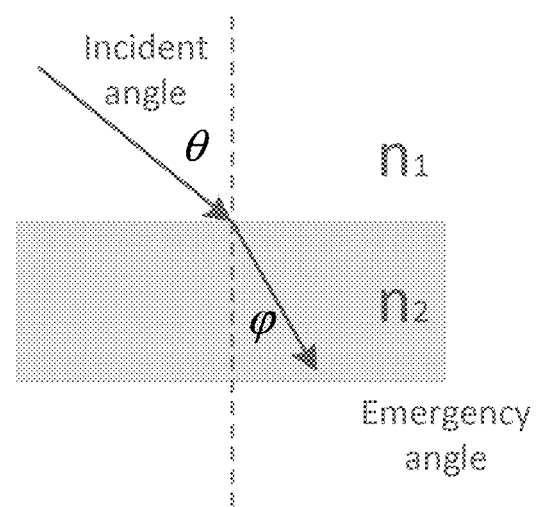
FIG. 9 is a diagram showing the principle of refraction in the present invention.

With reference to FIG. 8, a measurement method based on the system for measuring concentration of a gas component includes the following steps:

S1: preset a type of a to-be-measured gas, a required type of a spectrum and a corresponding wavelength λ of the spectrum, mount a light source corresponding to the type of the spectrum, and acquire the thickness L of a to-be-measured gas box 8;

S2: according to the type of the spectrum and the corresponding wavelength λ of the spectrum, comprehensively select a filter lens 2 to obtain a refractive index n and a thickness d of the fiber lens, and also obtain an incidence angle θ of the light source on an in-light surface of the filter lens and an initial light intensity $I_0$ after the light source passes through the corresponding filter lens;

With reference to FIG. 9, refraction is generated when a light irradiates from one medium to another medium. An incidence angle $θ_1$ and an exit angle φ has a relationship:

$$n_1 \cdot \sin θ_1 = n_2 \cdot \sin φ \quad (1);$$

where the refractive index in vacuum is 1, namely n=150

$$n1 = \frac{\sin θ_1}{\sin φ} \quad (2)$$

If the same monochromatic light propagates in different mediums, its wavelength is different because of different frequencies. If $λ_1$ is used for representing the wavelength of the light in vacuum and $n_2$ represents the refractive index of the medium, the wavelength λ' or the speed v of the light in the medium is $$λ' = \frac{λ_1}{n_2} \text{ or } v = \frac{c}{n_2} \quad (3)$$

Figure 10:
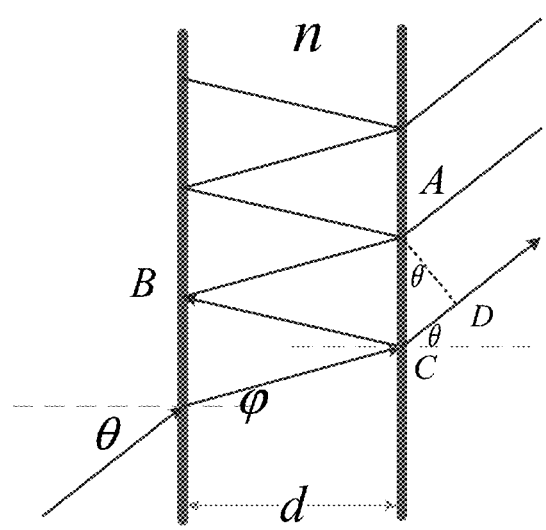
FIG. 10 is a schematic diagram of a Fabry-Perot interferometer.

With reference to FIG. 10 which is a schematic diagram of a Fabry-Perot interferometer, when the light passes through a filter lens with the medium n and the thickness d, it can be known that the speed or the wavelength is changed according to formula (3), so an optical path difference of transmitted lights is as follows:

$$Δ = n(AB + BC) − CD \quad (4)$$

where $$AB = BC = \frac{d}{\cos φ} \quad CD = AC \sin θ$$

$$AC = 2d \cdot \tan φ, \text{ so } CD = 2d \cdot \tan φ \cdot \sin θ$$

Based on formula (2), it can be known $$n = \frac{\sin θ}{\sin φ}$$

If the above equation is substituted into (4), it can be obtained $$Δ = 2nd \cos φ \quad (5)$$

So an m-level bright fringe of the Fabry-Perot interferometer (F-P interferometer) is:

$$Δ = 2nd \cos φ = mλ \quad (6)$$

namely $$λ = \frac{2nd \cos φ}{m} \quad (7)$$

(2) and (7) are simultaneous to obtain $$λ(θ) = \frac{2nd \cos\left[\arcsin\left(\frac{\sin θ}{n}\right)\right]}{m}$$

where m is a constant representing the m-level bright fringe of the Fabry-Perot interferometer; d represents the thickness of the filter lens; and $$0 < θ < \frac{π}{2}.$$

In the embodiment, $$λ = \frac{2nd \cos\left[\arcsin\left(\frac{\sin θ_i}{n}\right)\right]}{m}, θ = \min[θ_i],$$

i=1, 2, 3, 4, 5, and 6.

S3: control the rotation driving motor 4d to rotate by the controller 6 such that the light source irradiates the filter lens 2 with the corresponding refractive index n;

S4: control the servomotor 4e to drive extension by the controller 6 such that the deflection driving shaft sleeve 4b pulls the first lever of the universal joint 4a to deflect an angle θ along a lever joint;

S5: acquire an out-put light intensity $I_v$ measured by the light intensity measurement film 9a by the controller 6;

S6: according to the initial light intensity $I_0$ and the out-put light intensity $I_v$, calculate the concentration c of a component of the to-be-measured gas in the to-be-measured gas box 8 in combination with the beer-lambert law.

According to the initial light intensity $I_0$ and the out-put light intensity $I_v$, the concentration c of a component utilizes the following formula:

$$I_v = I_0 \exp[−a(v)cL];$$

where a(v) is an attenuation coefficient which is set by querying a table in the embodiment. L is the thickness L of the box body of the to-be-measured gas box 8.

Figure 11:
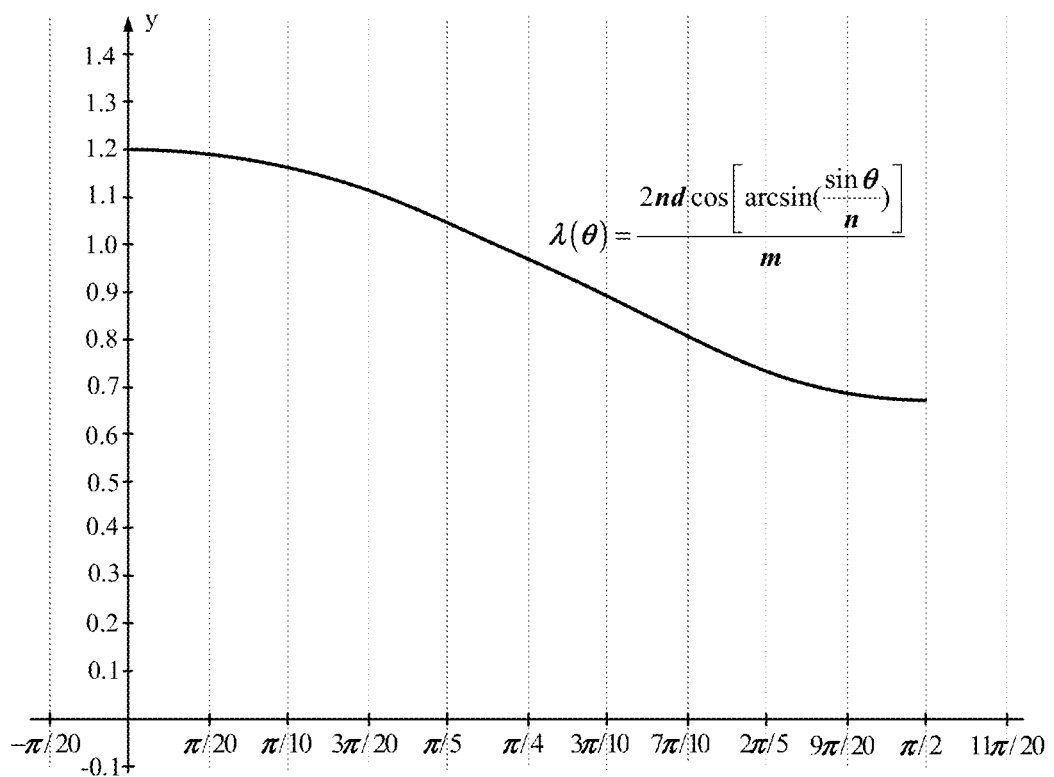
FIG. 11 is a schematic diagram showing influence on wavelengths by changes of an incidence angle of a light after the light passes through the filter lens.

By taking the wavelength λ as a dependent variable and the incidence angle θ as an independent variable, a functional image as shown in FIG. 11 is drawn. Referring to FIG. 11, when the incidence angle θ is changed from $$\frac{π}{2}$$

to 0, the wavelength is also increased.

Figure 12:
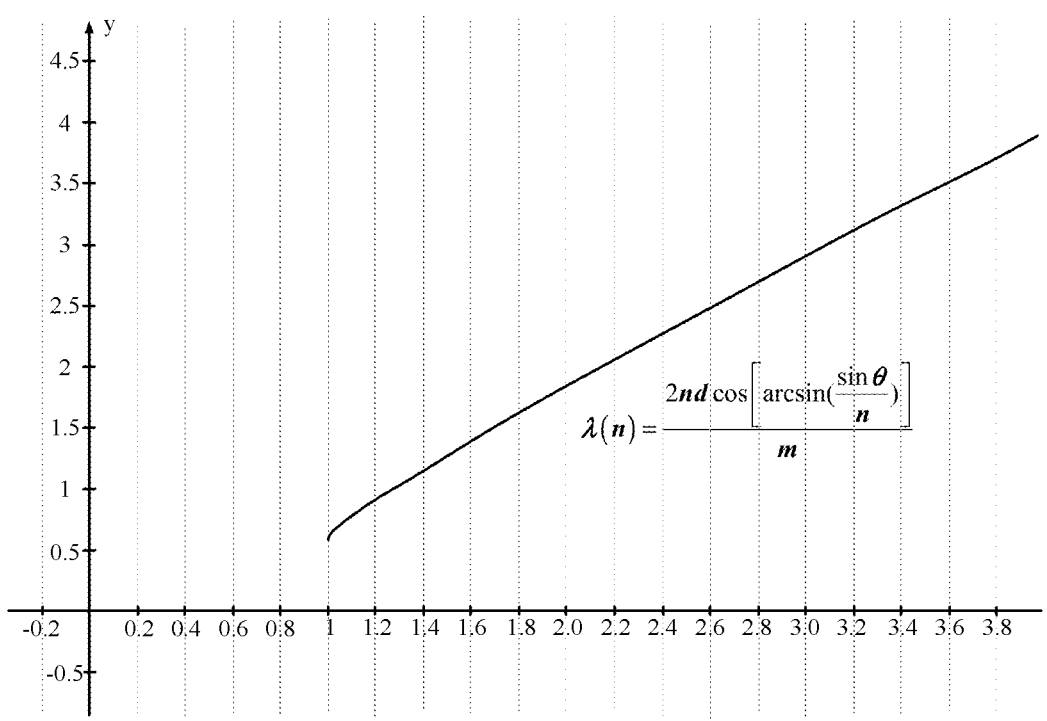
FIG. 12 is a schematic diagram showing influence on wavelengths by changes of the refractive index of a filter lens.

Similarly, by taking λ as a dependent variable and the refractive index n as an independent variable, a functional image as shown in FIG. 12 is drawn. Referring to FIG. 12, when the refractive index is n>1, the wavelength is increased along with the increasing the refractive index.

In the present invention, the filter plate 1, the to-be-measured gas box 8 and the light intensity receiving plate 9 are arranged in parallel, and 6 filter lenses 2 are arranged on the plate surface of the filter plate 1. The filter plate 1 is controlled to rotate such that the light source passes through different filter mediums. In combination with the servomotor 4e and the deflection driving shaft sleeve 4b, the universal joint 4a is pulled to deflect. The light source is not changed, but a currently arranged direction of the filter plate 1 is changed such that the light source deflects in a horizontal direction in FIG. 1 so as to change the incident angle of the light source. The specific wavelength is obtained by changing a medium, through which a spectrum passes and an incident angle of the spectrum. By utilizing the system of the present invention, the specific wavelengths of different spectrums can be obtained; a range of wavelengths to be modulated is large; a modulation procedure is easy; the structure is simple; an objective of testing various samples can be achieved without the need of changing the device; the application range is wide.

It should be noted that the above description is not intended to limit the present invention, and the present invention is not limited to the above embodiments. Changes, modifications, additions or replacements made by those ordinary skill in the art within the essential range of the present invention should fall within the protection scope of the present invention.

What is claimed is:

1. A wavelength-modulable spectrum generator, comprising a filter plate (1), wherein a plate surface of the filter plate (1) is encircled with N filter holes, and a filter lens (2) with a specific refractive index is correspondingly fixedly arranged in each filter hole;
    a light source mounting position (3) is fixed to a side of an in-light surface of the filter plate (1), and after any light source is mounted at the light source mounting position (3), lights of the light source irradiate the filter lens (2);
    a rotation and deflection driving mechanism (4) is connected with an out-light surface of the filter plate (1) and drives the filter plate (1) to rotate or deflect along an axis according to a preset angle, wherein the rotation and deflection driving mechanism (4) comprises a universal joint (4a); the universal joint (4a) comprises sequentially connected first lever and second lever; the first lever of the universal joint (4a) is connected with a center of the out-light surface of the filter plate (1) while the second lever of the universal joint (4a) is connected with a rotation driving shaft of a rotation driving motor (4d);
    a deflection driving shaft sleeve (4b) movably sleeves the first lever of the universal joint (4a); a hinge joint is arranged on the deflection driving shaft sleeve (4b) and is connected with a drive rod of a servomotor (4e); and
    the rotation driving motor (4d) and the servomotor (4e) are arranged on a support frame (5).

2. The wavelength-modulable spectrum generator according to claim 1, wherein a horizontal deflection limit frame (4f) is also hinged between the deflection driving shaft sleeve (4b) and the support frame (5);
    the horizontal deflection limit frame (4f) comprises a first hinge block and a second hinge block;
    the first hinge block is fixed to the deflection driving shaft sleeve (4b);
    the second hinge block is fixed to the support frame (5), the second hinge block extends in a horizontal direction of the rotation driving shaft and then is hinged with the first hinge block, and a hinging axial line is in parallel with a deflection axial line of the deflection driving shaft sleeve (4b); and
    the hinging axial line of the first hinge block and the second hinge block passes through a connection point of the first lever and the second lever of the universal joint (4a).

3. The wavelength-modulable spectrum generator according to claim 2, further comprising a controller (6), wherein a rotation driving end of the controller (6) is connected with the rotation driving motor (4d);
    a deflection driving end of the controller (6) is connected with the servomotor (4e); and
    a deflection angle measuring end of the controller (6) is connected with an angle sensor (7) arranged in the servomotor (4e).

4. A system for measuring concentration of a gas component based on the wavelength-modulable spectrum generator according to claim 3, further comprising: a to-be-measured gas box (8) and a light intensity receiving plate (9), which are fixed to the first lever of the universal joint (4a), wherein the to-be-measured gas box (8) and the light intensity receiving plate (9) are sequentially arranged between the out-light surface of the filter plate (1) and the deflection driving shaft sleeve (4b), and the filter plate (1), the to-be-measured gas box (8) and the light intensity receiving plate (9) are coaxially arranged and are mutually parallel;
    a box body of the to-be-measured gas box (8) is fabricated by a transparent material and is filled with a to-be-measured gas; and
    a light intensity measurement film (9a) is arranged on the light intensity receiving plate (9) and is connected with a gas measurement input end of the controller (6).

5. A measurement method based on the system for measuring concentration of the gas component according to claim 4, specifically comprising the following steps:
    S1: presetting a type of the to-be-measured gas, a required type of a spectrum and a corresponding wavelength $\lambda$ of the spectrum, mounting a light source corresponding to the type of the spectrum, and acquiring thickness L of the box body of the to-be-measured gas box (8);
    S2: according to the type of the spectrum and the corresponding wavelength $\lambda$ of the spectrum, comprehensively selecting the filter lens (2) to obtain a refractive index n and thickness d of the fiber lens, and also obtaining an incidence angle $\theta$ of the light source on an in-light surface of the filter lens and an initial light intensity $I_0$ after the light source passes through the corresponding filter lens;
    S3: controlling the rotation driving motor (4d) to rotate by the controller (6) such that the light source irradiates the filter lens (2) with the corresponding refractive index n;
    S4: controlling the servomotor (4e) to drive extension by the controller (6) such that the deflection driving shaft sleeve (4b) pulls the first lever of the universal joint (4a) to deflect an angle $\theta$ along a lever joint;
    S5: acquiring an out-put light intensity $I_v$ measured by the light intensity measurement film (9a) by the controller (6); and
    S6: according to the initial light intensity $I_0$ and the out-put light intensity $I_v$, calculating the concentration c of a component of the to-be-measured gas (8) in the to-be-measured gas box in combination with a Beer-Lambert law.

6. The measurement method based on the system for measuring concentration of the gas component according to claim 5, wherein in step S2, an incident angle of the light source is obtained by calculating according to formula (1):

$$\lambda = \frac{2nd\,\cos\left[\arcsin\left(\frac{\sin\theta}{n}\right)\right]}{m};\quad(1)$$

wherein m is a constant; d is a thickness of the filter lens; and $$0 < \theta < \frac{\pi}{2}.$$

7. The measurement method based on the system for measuring concentration of the gas component according to claim 5, wherein step S6 of calculating the concentration c of the component according to the initial light intensity $I_0$ and the output light intensity $I_v$ utilizes the following formula:

$$I_v = I_0 \exp[-a(v)cL] \quad(2);$$

wherein a(v) is an attenuation coefficient, and L is the thickness of the box body of the to-be-measured gas box (8).

8. The wavelength-modulable spectrum generator according to claim 1, further comprising a controller (6), wherein a rotation driving end of the controller (6) is connected with the rotation driving motor (4d);

a deflection driving end of the controller (6) is connected with the servomotor (4e); and a deflection angle measuring end of the controller (6) is connected with an angle sensor (7) arranged in the servomotor (4e).

9. A system for measuring concentration of a gas component based on the wavelength-modulable spectrum generator according to claim 8, further comprising: a to-be-measured gas box (8) and alight intensity receiving plate (9), which are fixed to the first lever of the universal joint (4a), wherein the to-be-measured gas box (8) and the light intensity receiving plate (9) which are sequentially arranged between the side of the out-light surface of the filter plate (1) and the deflection driving shaft sleeve (4b), and the filter plate (1), the to-be-measured gas box (8) and the light intensity receiving plate (9) are coaxially arranged and are mutually parallel;

a box body of the to-be-measured gas box (8) is fabricated by a transparent material and is filled with a to-be-measured gas; and a light intensity measurement film (9a) is arranged on the light intensity receiving plate (9) and is connected with a gas measurement input end of the controller (6).

10. A measurement method based on the system for measuring concentration of the gas component according to claim 9, specifically comprising the following steps:

S1: presetting a type of the to-be-measured gas, a required type of a spectrum and a corresponding wavelength λ of the spectrum, mounting alight source corresponding to the type of the spectrum, and acquiring a thickness L of the box body of the to-be-measured gas box (8);

S2: according to the type of the spectrum and the corresponding wavelength λ of the spectrum, comprehensively selecting the filter lens (2) to obtain a refractive index n and a thickness d of the fiber lens, and also obtaining an incidence angle θ of the light source on an in-light surface of the filter lens and an initial light intensity $I_0$ after the light source passes through the corresponding filter lens;

S3: controlling the rotation driving motor (4d) to rotate by the controller (6) such that the light source irradiates the filter lens (2) with the corresponding refractive index n;

S4: controlling the servomotor (4e) to drive extension by the controller (6) such that the deflection driving shaft sleeve (4b) pulls the first lever of the universal joint (4a) to deflect an angle θ along a lever joint;

S5: acquiring an out-put light intensity $I_v$ measured by the light intensity measurement film (9a) by the controller (6); and S6: according to the initial light intensity $I_0$ and the out-put light intensity $I_v$, calculating the concentration c of a component of the to-be-measured gas (8) in the to-be-measured gas box in combination with a Beer-Lambert law.

11. The measurement method based on the system for measuring concentration of the gas component according to claim 10, wherein in step S2, an incident angle of the light source is obtained by calculating according to formula (1):

$$\lambda = \frac{2nd\,\cos\left[\arcsin\left(\frac{\sin\theta}{n}\right)\right]}{m};\quad(1)$$

wherein m is a constant; d is a thickness of the filter lens; and $$0 < \theta < \frac{\pi}{2}.$$

12. The measurement method based on the system for measuring concentration of the gas component according to claim 10, wherein step S6 of calculating the concentration c of the component according to the initial light intensity $I_0$ and the out-put light intensity $I_v$ utilizes the following formula:

$$I_v = I_0 \exp[-a(v)cL] \quad(2);$$

wherein a(v) is an attenuation coefficient, and L is the thickness of the box body of the to-be-measured gas box (8).

* * * * *